United States Patent Office 3,519,604
Patented July 7, 1970

3,519,604
COMPOSITION COMPRISING AN EPOXY RESIN, A POLYCARBOXYLIC ACID ANHYDRIDE AND AN AMINOPYRIDINE
Juerg Maurer, Riehen, Switzerland, assignor to Ciba Limited, Basel, Switzerland, a company of Switzerland
No Drawing. Filed Nov. 19, 1968, Ser. No. 777,184
Claims priority, application Switzerland, Dec. 8, 1967, 17,250/67
Int. Cl. C08g 30/14
U.S. Cl. 260—47  9 Claims

ABSTRACT OF THE DISCLOSURE

Storable mixtures, which cure rapidly at elevated temperature and are suitble for the manufacture of shaped structures, impregnations, coatings and adhesive bonds, especially when used in form of sinter powers, characterized in that they contain (a) a polyepoxy compound whose molecule contains on an average more than one epoxide group,
(b) a polycarboxylic acid anhydride as curing agent and
(c) as curing accelerator a monoaminopyridine of the formula

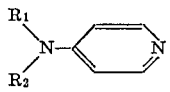

or

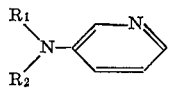

in which, independently of each other, $R_1$ and $R_2$ represent a hydrogen atom or an aliphatic, cycloaliphatic, cycloaliphatic, araliphatic or aromatic residue each, or $R_1+R_2$ represent a divalent aliphatic, cycloaliphatic or araliphatic residue.

---

It is known that epoxy resins can be cured with polycarboxylic acid anhydrides at an elevated temperature to form insoluble, crosslinked, high-molecular products. The cured products are distinguished by generally good chemical and mechanical properties. As a rule, curing requires high temperatures and even then it takes a long time in many cases. It has, therefore, been proposed to add curing accelerators such as polyhydric alcohols or tertiary amines. While polyalcohols used as accelerators have the advantage that in general they do not adversely affect the storability of the cured products, their accelerating effect is relatively slight.

Tertiary amines used as accelerators likewise have various disadvantages: Even at a curing temperature within the high range from 150 to 250° C. the curing takes a rule several hours, which is undesirable for many uses as a thermocuring coating or moulding product. Thus, for example, in white powder lacquers objectionable yellowing occurs. It is a particularly serious disadvantage of the tertiary amines known as accelerators, for example benzyl dimethylamine, that such mixtures of epoxy resin+curing agent+accelerator do not keep well. It is, therefore, impossible to formulate on this basis storable one-component systems, such as "prepregs," moulding compositions or sinter powders. To overcome these disadvantages British specification No. 1,050,678 proposed to use imidazoles whose ring contains a secondary amine group, for example 2-ethyl-4-methylimidazole.

While these accelerators as such constituted an advance over other known accelerators, an effective acceleration still requires a relatively large amount of accelerator of the order of about 2 parts by weight for every 100 parts by weight of epoxy resins. Such relatively large quantities, however, impair the storability and the mechanical and chemical properties of the cured products.

Surprisingy, it has now been found that certain monoaminopyridines substituted in position 3 or 4 have a much higher accelerating capacity, when used in only one tenth that quantity, than is found with the imidazoles described in British specification No. 1,050,678. It is surprising to observe that in contradistinction to the imidazoles known as accelerators the storability and the properties of the cured products are not impaired when such small effective quantities are used.

Accordingly, the present invention provides storable mixtures, rapidly curable at elevated temperatures, which are suitable for the manufacture of shaped structures, impregnations, coatings and adhesive bonds, especially when used in form of sinter powders; the mixtures of this invention are characterized in that they consist of (a) a polylpoxy compound whose molecule contains on an average more than one epoxide group,
(b) a polycarboxylic acid anhydride as curing agent, and
(c) as curing accelerator a monoaminopyridine of the formula

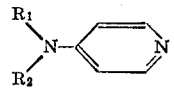

or

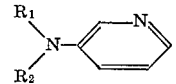

in which $R_1$ and $R_2$, independently of each other, represent a hydrogen atom or an aliphatic, cycloaliphatic, araliphatic or aromatic residue each, or $R_1+R_2$ represent a divalent aliphatic, cycloaliphatic or araliphatic residue.

Accordingly, the curing accelerators to be used according to this invention are pyridines monosubstituted by $NH_2$ or $NR_2$ groups in position 3 or 4 ($R=H$, aryl or the like). The 3-aminopyridines and 4-aminopyridines are highly efficacious accelerators for anhydride curing even when used in a very small quantity (0.2 part thereof for every 100 parts of epoxy resin).

It was found that, apart from 3-aminopyridine and 4-aminopyridine, also, for example, 4-anilinopyridine but not 2-aminopyridine, is suitable for accelerating the anhydride curing.

Further suitable monoaminopyridines are 4-methylaminopyridine, 3-methylaminopyridine, 4-dimethylaminopyridine, 3-dimethylaminopyridine, 4-ethylaminopyridine, 4-butylaminopyridine, 4-toluidinopyridine, 4-cyclohexylaminopyridine, 4-piperidinopyridine and 4-morpholinopyridine.

The following Table I shows the accelerating effect of various monoaminopyridines; in each test equal proportions of epoxy resin, hexahydrophthalic anhydride and accelerator have been used. The epoxy resin A used was a bisphenol A-polyblycidyl ether obtained by reacting epichlorohydrin with 2,2-bis(p-hydroxyphenyl)-propane in the presence of alkali, having the following characteristics: Melting point (Durran) 65–75° C.; containing 1.8–2.4 epoxide equivalents per kg.; specific gravity: 1.19; containing 0.01% of hydrolyzable chlorine.

TABLE I

| Epoxy resin 100 g. each | Curing agent 26.2 g. each | Accelerator 0.2 g. each | Gelling time 180+ 2° C. (seconds) |
| --- | --- | --- | --- |
| A | Hexahydrophthalic anhydride | | 900 |
| A | do | 4-aminopyridine | 405 |
| A | do | 4-anilinopyridine | 315 |
| A | do | 3-aminopyridine | 130 |
| A | do | 2-aminopyridine | 900 |

The accelerator should be distributed in the epoxy resin system as homogeneously as possible, that is to say it is advantageous to use it in micro-dispersed or dissolved form.

The effect of the accelerator is clearly visible even with very low concentrations. In general 0.05 to 0.5 part by weight thereof for every 100 parts of epoxy resin suffice. It is preferable to use about 0.2 part by weight for every 100 parts by weight of resin.

As polycarboxylic acid anhydrides (b) to be used in the curable mixtures of this invention there may be mentioned, for example, the anhydrides of the following acids: Phthalic, $\Delta^4$ - tetrahydrophthalic, hexahydrophthalic, 4 - methylhexahydrophthalic, 3,6 - endomethylene - $\Delta^4$ - tetrahydrophthalic, methyl - 3,6 - endomethylene - $\Delta^4$ - tetrahydrophthalic (=methyl nadic anhydride), 3,4,5,6,7,7-hexachloro - 3,6 - endomethylene - $\Delta^4$ - tetrahydrophthalic, succinic, adipic, azelaic, sebacic, maleic, allylsuccinic, dodecenylsuccinic acid; furthermore 7-allyl-bicyclo (2.2.1)-hept-5-ene,2,3-dicarboxylic acid anhydride, pyromellitic acid dianhydride or mixtures of such anhydrides. It is advantageous to use 0.5 to 1.1 gram equivalents of anhydride groups of the anhydride curing agent for every gram equivalent of epoxide groups.

As polyepoxy compounds, whose molecule contains on an average more than 1 epoxide group, to be used in the curable mixtures of this invention there may be specially mentioned: Alicyclic polyepoxides such as epoxyethyl-3,4-epoxycyclohexane (vinylcyclohexene diepoxide), limonene diepoxide, dicyclopentadiene diepoxide, bis(3,4-epoxycyclohexylmethyl)adipate, (3′,4′ - epoxycyclohexylmethyl) - 3,4 - epoxycyclohexane carboxylate, (3′4′ - epoxy - 6′ - methylcyclohexylmethyl) - 3,4 - epoxy - 6 - methylcyclohexane carboxylate, 3 - (3′4′ - epoxycyclohexyl) - 2,4 - dioxaspiro(5.5) - 8,9 - epoxyundecane, 3 - (glycidyloxyethoxyethyl) - 2,4 - dioxaspiro(5.5) - 8,9 - epoxyundecane and 3,9 - bis(3′,4′ - epoxycyclohexyl) - spirobi(meta-dioxane); di- or polyglycidyl ethers of polyhydric alcohols such as 1,4-butanediol, or of polyglycols such as polypropylene-glycols; di- or polyglycidyl ethers of polyhydric phenols such as resorcinol, bis(p-hydroxyphenyl)methane, 2,2-bis(p-hydroxyphenyl)propane (diomethane), 2,2 - bis(4′ - hydroxy - 3′,5′ - dibromophenyl) propane, 1,1,2,2 - tetrakis(p - hydroxyphenyl)ethane, or condensation products of phenols with formaldehyde prepared under acid conditions such as phenol-novolaks and cresolnovolaks; furthermore di- and poly-($\beta$-methylglycidyl)ethers of the above-mentioned polyalcohols and polyphenols; polyglycidyl esters of polyvalent carboxylic acids such as phthalic, terephthalic, tetrahydrophthalic and hexahydrophthalic acid; N-glycidyl derivatives of amines, amides and heterocyclic nitrogen bases such as N,N-diglycidylaniline, N,N-diglycidyltoluidine, N,N,N′,N′-tetraglycidyl - bis (p - aminophenyl)methane; triglycidyl - isocyanurate; N,N′ - diglycidyl - 5,5 - dimethylhydantoin.

The mixtures of resin, curing agent and accelerator according to this invention are preferably cured for about 30 minutes at 150–200° C. In the preferred use of curable mixtures of this invention in form of sinter powders, using, for example 4-aminopyridine as accelerator, a curing cycle of 30 minutes at 150° C is possible, whereas when a similarly composed sinter powder containing a known accelerator was used, a curing cycle of 45 to 50 minutes at 180° C. was needed.

The term "curing" as used in this context means the conversion of the soluble, either liquid or fusible, polyepoxides into solid, insoluble and infusible, three-dimensionally crosslinked products or materials, as a rule with simultaneous shaping to yield shaped structures, such as castings, mouldings, laminates or the like, or "flat two-dimensional structures" such as coatings, lacquers films or adhesive bonds.

If desired, curing may be performed in two stages by terminating the curing reaction prematurely, whereby a still fusible and soluble, curable precondensate (the so-called "B-stage") is obtained which consists of the epoxide component (a) and the anhydride curing agent (b). Such a precondensate is more or less restrictedly storable and may be used, for example, for the manufacture of "prepregs," moulding compositions or more especially sinter powders.

The curable mixtures of this invention may further contain suitable plasticizers such as dibutylphthalate, dioctylphthalate or tricresylphosphate, inert organic solvents or so-called active diluents, especially monoepoxides, for example styrene oxide, butylglycide or cresylglycide.

Furthermore, the curable mixtures of this invention may be admixed at any stage prior to the curing operation with extenders, fillers and reinforcing agents such, for example, as coal tar, bitumen, textile fibres, glass fibres, asbestos fibres, boron fibres, carbon fibres mineral silicates, mica, quartz meal, titanium dioxide, alumina hydroxide, bentones, kaolin, silica-aerogel or metal powders such as aluminum powder, also with pigments or dyestuffs, such as lampblack, oxide dyestuffs, titanium dioxide or the like. The curable mixtures may further contain other conventional additives, for example flame-proofing agents such as antimony trioxide, thixotropizing agents, flow control agents such as silicones, cellulose acetobutyrate, polyvinylbutyral, waxes, stearates and the like (some of which are also used as mould release agents).

The curable mixtures of this invention can be manufactured in the usual manner with the use of known mixers (stirrers, kneaders, roller mills etc.).

The curable epoxy resin mixtures of this invention are primarily used in surface protection, in the electrical industry, in laminating and in building work. They may be manufactured in the form best suited to the individual purpose, in the filled or unfilled state, if desired in form of solutions or emulsions, as paints, lacquers, moulding compositions, dipping resins, casting resins, injection moulding compositions, impregnating resins and as adhesives, as tool resins, laminating resins, sealing and grouting compositions, flooring compositions and as binders for mineral aggregates.

The main sphere of application is that of the moulding powders and especially of the sinter powders. For this use the epoxy resin powder mixtures may be worked by known processes, with or without application of superatmospheric pressure, such as the fluidized bed process, the electrostatic fluidized bed process, by spraying, electrostatic spraying, pressing or the like.

Unless otherwise indicated, parts and percentages in the following examples are by weight. The relationship between parts by volume and parts by weight is the same as that between the millilitre and the gram.

For the manufacture of the curable epoxy resin mixtures described in the examples the following epoxy resins were used:

EPOXY RESIN B

Solid bisphenol A-polyglycidyl ether, obtained by condensing epichlorohydrin with 2,2-bis(p-hydroxyphenyl) propane [bisphenol A] in the presence of alkali, having the following characteristics:

Content of epoxide equivalents—0.4–0.5 per kg.
Melting point (Durran)—125–135° C.
Specific gravity—1.18
Content of hydrolyzable chlorine—0.03%

EPOXY RESIN C

Solid bisphenol A-polyglycidyl ether, prepared by condensing epichlorohydrin with bisphenol A in the presence of alkali, having the following characteristics:

Content of epoxide equivalents—2.2 per kg.
Melting point—60–75° C.
Specific gravity—1.19
Viscosity of the melt at 130° C.—1000 centipoises
Content of hydrolyzable chlorine—0.018%

EPOXY RESIN D

Polypropyleneglycol-diglycidyl ether, liquid at room temperature, prepared by condensing excess epichlorohydrin (4 mols) with polypropyleneglycol of average molecular weight 425 (1 mol), containing 2.3–2.8 epoxide equivalents per kg. and 1.77% of hydrolyzable chlorine.

EPOXY RESIN E

Cycloaliphatic epoxy resin of the formula

[3,9-bis(3′,4′ - epoxycyclohexyl) - spirobi(meta-dioxan)] having the following characteristics:

Content of epoxide equivalents—4.4–4.7 per kg.
Softening point—about 49–50° C.

Measuring the gelling time

In the following examples the gelling time was measured by an internal testing method, in which:

An electric heating plate (diameter 115 mm.; makers Messrs. Electro-Physik, Cologne) was adjusted to the test temperature. The temperature was measured with a laterally inserted sensor of a thermoelement (seconds-thermometer, makers Messrs. Quarz A. G., Zurich). The temperature was kept constant within a range of $\mp 2°$ C.

About 0.5 g. of test material was placed upon the heater plate and at the same time a stopwatch was started, and the molten material was then moved to and fro with a spatula. As curing progressed, the viscosity began to increase apace. The spatula was periodically raised and the formation of a filament observed. The point in time at which the filament formation suddenly collapsed and the material gelled to form a coherent layer is the end point of the test and is stopped by the stopwatch. The gelling time measured in this manner is indicated in seconds.

EXAMPLE 1

Two different mixtures (test specimens 1 and 2 of an epoxy resin+anhydride curing agent were prepared by melting and mixing at 120° C. in 50 g.-lots in beakers, once without and once with addition of 0.2% by weight of 4-aminopyridine referred to the epoxy resin. By cautiously triturating the cooled mixtures in a mortar the insoluble 4-aminopyridine was dispersed in the epoxy resin as finely as possible.

As can be seen from the following Table II, the gelling times of the mixtures were considerably shortened by the small addition of 4-aminopyridine.

TABLE II

| | Test 1 | Test 2 |
|---|---|---|
| Epoxy resin E, grams | 50 | 50 |
| Hexahydrophthalic anhydride, grams | 30.75 | 30.75 |
| 4-aminopyridine, grams | | 0.1 |
| Gelling time in seconds, at 180+2° C | 720 | 144 |

EXAMPLE 2

In this example a sinter powder I was prepared, which contains as curing agent an acid anhydride and as accelerator a catalytic amount (0.1%) of 4-aminopyridine, and its properties were compared with those of an equivalent sinter powder II which contains a known, conventional accelerator, namely 2-ethyl-4-methylimidazole, in a larger amount (0.88%).

Composition of sinter powder I:                                Parts
Epoxy resin B _____ 1924.5
Mixture of 65 parts of epoxy resin C and 35
  parts of epoxy resin D _____ 378.9
Titanium dioxide (rutile modification) _____ 147.9
Barium sulphate _____ 100.0
Polyvinylbutyral (registered trademark Butvar
  D-150), as flow control agent _____ 52.5
Polyethylene powder _____ 8.4
Hexahydrophthalic anhydride _____ 384.9
4-aminopyridine _____ 2.9

Manufacturing sinter powder I

The epoxy resins were heated at a temperature rising to 170° C. and thus melted in a suitable mixing vessel. Then the flow control agent, polyethylene, titanium dioxide and barium sulphate were stirred into the melt which was further stirred mechanically, without supply of heat, during which the temperature of the mixture dropped to 140° C.; then the anhydride curing agent was added. After a total stirring time of 20 minutes the mixture was poured out over a plate covered with a cellophane foil. The solidified material was powdered in a beater mill (sieve of 3 mm. mesh).

The accelerator 4-aminopyridine was ground for 24 hours in a 4.5-litre ball mill with 1 part of titanium dioxide (rutile modification). The accelerator thus prepared and the mixture of resin+filler+flow control agent+curing agent were thoroughly mixed in the dry state at the correct proportions by weight (for example in a ball mill without balls) and then continuously homogenized in a Ko-kneader (BUSS, model PR 46) at a temperature of 80 to 90° C. at a contact time of 4 minutes.

The cooled, solidified mixture was ground, first coarsely (beater mill with 3 mm. sieve) and then finely (rod mill, 1200 r.p.m.). After sieving to a particle size of $\leq 60\mu$ and epoxy resin powder was obtained which was extremely suitable for electrostatic spray application.

Composition of sinter powder II

As described for sinter powder I, except that 25.5 parts by weight of 2-ethyl-4-methylimidazole (=0.88%) instead of 2.9 parts by weight of 4-aminopyridine (=0.1%) were used.

Manufacturing sinter powder II

Sinter powder II was manufactured as described for sinter powder I, with the following differences:

The accelerator 2-ethyl-4-methylimidazole was dissolved with melting in the anhydride curing agent to form a mixture of curing agent+accelerator, which was then continuously homogenized with the mixture of resin+filler+flow control agent.

The properties of the two sinter powders I and II are compared in the following Table III which further lists the properties of cured coatings (deep drawing test according to Erichsen) obtained by applying the sinter powders with an electrostatic spray installation of Messrs. Sames to cold sheet iron and subsequent stoving for 15 and 40 minutes respectively at 180° C.

TABLE III

| | Sinter powder | |
|---|---|---|
| | I | II |
| Melting point (DSC¹), °C | 52 | 55 |
| Reaction maximum (DSC¹), °C | 180 | 200 |
| Gelling time at 180±2° C., seconds | 75 | 240 |
| Deep drawing value according to Erichsen (DIN 53 156): | | |
| After 15 minutes at 180° C., mm | 9.9 | 0.7 |
| After 40 minutes at 180° C., mm | | 9.9 |
| Storability | Good | Good |

¹ Differential scanning calorimeter DSC 1 (Perkin Elmer), temperature rise 16° C./minute.

From these comparative experimental data it is clear that the sinter powder I according to this invention—which, referred to the nitrogen content of accelerator, contains 7.5 times less catalyst than does sinter powder II—can be cured within a substantially shorter time than the known sinter powder II, namely in 15 minutes instead of in 40 minutes, at 180° C. However, notwithstanding this increased reactivity the storability is not impaired.

I claim:
1. A curable composition of matter consisting essentially of
   (a) a polyepoxide whose molecule contains on an average more than one 1,2-epoxide group,
   (b) a polycarboxylic acid anhydride as curing agent and
   (c) as curing accelerator a monoaminopyridine of the formula

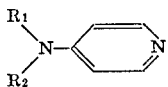

or of the formula

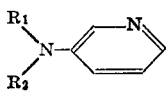

in which two formulae, $R_1$ and $R_2$ each represents a member selected from the group consisting of hydrogen atom, aliphatic, cycloaliphatic, araliphatic and aromatic hydrocarbon residue, or $R_1$ and $R_2$ together represent a divalent residue selected from the group consisting of divalent aliphatic, cycloaliphatic and araliphatic hydrocarbon residue.

2. A composition as claimed in claim 1, which contains 4-aminopyridine as accelerator (c).

3. A composition as claimed in claim 1, which contains 3-aminopyridine as accelerator (c).

4. A composition as claimed in claim 1, which contains 4-anilinopyridine as accelerator (c).

5. A composition as claimed in claim 1, which contains 0.05 to 0.5 part by weight of the monoaminopyridine (c) for every 100 parts by weight of the polyepoxide (a).

6. A composition as claimed in claim 1, which contains about 0.2 part by weight of the monoaminopyridine (c) for every 100 parts by weight of the polyepoxide (a).

7. A composition as claimed in claim 1, which contains as polyepoxide (a) a polyglycidyl ether of a polyhydric phenol.

8. A composition as claimed in claim 7, which contains as polyepoxide a polyglycidyl ether of 2,2-bis (p-hydroxyphenyl)propane.

9. A composition as claimed in claim 7, which contain as polyepoxide a polyglycidyl ether of a phenol-novolak or a polyglycidyl ether of a cresol-novolak.

References Cited

UNITED STATES PATENTS 2,717,885  9/1955  Greenlee.
2,949,441  8/1960  Newey.
2,965,609  12/1960  Newey.

HAROLD D. ANDERSON, Primary Examiner

T. PERTILLA, Assistant Examiner

U.S. Cl. X.R.

117—161; 161—184; 260—13, 28, 37, 59, 78.4